United States Patent Office 3,598,810
Patented Aug. 10, 1971

3,598,810
FLUORESCENT 1-(PYRAZOLINYLPHENYL-SULPHONYL)-PIPERAZINES
Eduard Troxler, Basel, and Heinrich Hausermann, Riehen, Switzerland, assignors to Geigy Chemical Corporation, Ardsley, N.Y.
No Drawing. Filed Oct. 8, 1968, Ser. No. 765,964
Claims priority, application Switzerland, Oct. 13, 1967, 14,364/67
Int. Cl. B44d 5/00; C07d 51/72
U.S. Cl. 260—239.7   4 Claims

ABSTRACT OF THE DISCLOSURE

Fluorescent 4-substituted 1-(pyrazolinylphenylsulphonyl)-piperazines which are soluble in aqueous acid media, are disclosed as optical brighteners especially for wool, fibers from synthetic polyamide, cellulose esters, polymers or copolymers of acrylonitrile, blends of such fibers as well as similar substrates. A typical novel compound is that of the formula

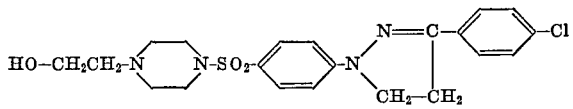

The present invention concerns new fluorescent 4-substituted 1 - (pyrazolinylphenylsulphonyl) - piperazines which with the addition of acid, are water-soluble, a process for the production of these compounds and their use for the optical brightening of substrates and especially fiber materials made from cellulosic fibers, in particular cotton, but also from wool, synthetic polyamides, polymers or copolymers of acrylonitrile, and cellulose esters, as well as blends of such fibers.

It has now been found that brilliant, neutral white brightening effects can be attained on cotton and the like cellulose fibers, as well as on polymers or copolymers of acrylonitrile, and also on wool and on synthetic polyamide fibers, cellulose ester fibers as well blends or mixed laundry loads of such fibers, with 1-(pyrazolinylphenylsulphonyl)-piperazines of Formula I

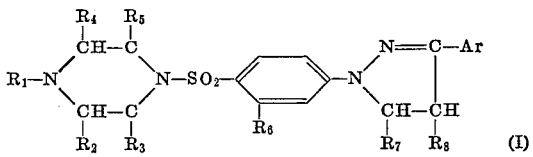

wherein Ar represents a carboxylic- or heterocyclic-aromatic radical which is unsubstituted or contains non-ionic, non-color-imparting substituents.

$R_1$ represents an optionally substituted alkyl, cycloalkyl, aralkyl or aryl group, a heterocyclic radical or a modified carboxyl group, $R_2$, $R_3$, $R_4$, $R_5$ independently of each other each represent hydrogen, halogen of an atomic number of at most 35, an arkyl group, cycloalkyl, aralkyl or aryl group, whereby $R_2$ and $R_3$ and/or $R_4$ and $R_5$ can be bridged by an alkylene or arylene radical, $R_6$ represents hydrogen, a lower alkyl group or halogen of an atomic number of at most 35.

$R_7$ represents hydrogen, a lower alkyl group or an aryl radical which is unsubstituted or contains non-ionic and non-color-imparting substituents.

$R_8$ represents hydrogen, a lower alkyl group, or a lower alkylene bridge to a ring carbon atom of Ar in o-position to the carbon atom of Ar which is linked to the pyrazoline ring.

In general, the new compounds according to the invention possess good solubility in water having a pH below 7.

In compounds falling under Formula I, the aryl radical Ar represents, for example, the unsubstituted phenyl radical or a phenyl radical substituted by fluorine, chlorine, or bromine, lower alkyl or alkoxy groups or acylamido, e.g. carbacylamido, groups such as lower alkanoylamido or alkoxycarbonylamido groups, in a substituted phenyl radical chlorine being preferred as p-substituent. As heterocyclic aromatic radical, Ar preferably represents the furyl or the thienyl radical, while $R_1$ represents, for instance, a lower alkyl group, particularly methyl or the neopentyl radical, a hydroxyalkyl group having from 1 to 3 carbon atoms, the benzyl group, the phenyl group, a phenyl radical mono- or di-substituted by chlorine, fluorine or lower alkyl groups, or a modified carboxyl group, in which case it preferably represents a carboxyl group esterified with a lower alkyl alcohol.

In compounds falling under Formula I which are particularly preferred because of their good brightening effects on cotton, wool as well as polyacrylonitrile fibers without greening even when used in relatively high concentrations.

Ar represents a carbocylic aromatic radical, and in more preferred compounds particularly a phenyl radical any substituent of which is selected fom halogen, in particular fluorine, chlorine or bromine, $R_1$ represents an optionally substituted alkyl, aralkyl or aryl group or a modified carboxyl group, and in more preferred compounds particularly lower alkyl, hydroxylalkyl of 1 to 3 carbon atoms, lower alkoxy-carbonyl, benzyl or a phenyl radical any substituent of which is selected from halogen, in particular chlorine and bromine, lower alkyl and trifluoromethyl, $R_7$ represents hydrogen, lower alkyl or phenyl, And each of $R_2$, $R_3$, $R_4$ and $R_5$ represent hydrogen or an alkyl group of preferably not more than 4 carbon atoms, While $R_6$ and $R_8$ have the same meanings as in Formula I, any alkylene bridge $R_8$ having preferably from 2 to 4 carbon atoms.

In the industrially most interesting compounds, $R_2$, $R_3$, $R_4$ and $R_5$ represent hydrogen or alkyl radicals having 1 to 4 carbon atoms, $R_6$, $R_7$ and $R_8$ preferably represent hydrogen, a lower alkyl group having 1 to 4 carbon atoms, furthermore $R_6$ also represents chlorine and $R_7$ also represents the phenyl radical.

Most preferred among these latter compounds are those in which Ar represents the p-chlorophenyl radical and $R_1$ represents a hydroxyalkyl group, whilst $R_2$, $R_3$, $R_4$, $R_5$, $R_7$ and $R_8$ are hydrogen, because of their excellent brightening effects on cotton.

Optical brighteners disclosed in German Pat. 1,080,963 and particularly a known brightener of the structural formula

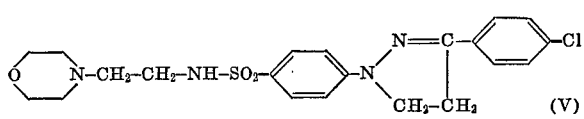

especially when used in detergent compositions, show quite satisfactory brightening effects on cotton, for instance, when treated in an exhaustion bath having a temperature of about 90 to 95° C., on nylon brightened from an exhaustion bath having a temperature in the range of about 90 to 110° C., and on wool or silk brightened from an exhaustion bath having a temperature of about 60° C.

In the known brightener of the above Formula V, the structural moiety consists of a heterocyclic nucleus, more especially the morpholine nucleus, linked to the nitrogen atom of the sulfamoyl-phenyl substituted in 1-position at the pyrazoline ring via an alkylene bridge, e.g. an ethylene bridge.

The corresponding optical brighteners in which the nitrogen atom of the heterocyclic radical is the nitrogen atom of the sulfamoyl group in the above-mentioned class of optical brighteners are completely unsatisfactory as optical brighteners for nylon, silk, wool or cotton in the above brightening conditions.

Unexpectedly, the optical brighteners according to the invention, and above all the brightener which is of the formula

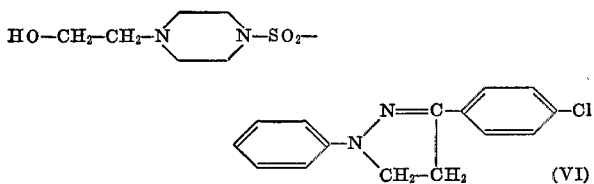

show excellent brightening effects on all of the above-mentioned fibers, especially under conditions of the above-stated brightening treatments or laundering-and-brightening treatments, which effects are at least as good or, particularly in the case of cotton and the like cellulose fibers, even better than those of the known brightener of Formula V.

The optical brighteners according to the invention and especially the compound of Formula IV are excellently suitable for the brightening of polyamide, polyacrylonitrile and cotton goods in mixed loads without any discoloration to any Dacron-type polyester goods present therein. This also applies to blended fabrics containing polyamide as well as polyester fibers, or cotton and polyester blends. No yellowing of the polyester portion of these blended fabrics is caused by the brightener according to the invention.

While the optical brighteners according to the invention, are applied to all of the abovementioned suitable fibers, preferably from an exhaustion bath, they can also be applied to cotton and especially on super polyamide fibers by a padding process with subsequent steaming or the like after-treatment.

German Pat. No. 1,080,963 describes, as optical brighteners also the 1,3-diaryl- or 1,3,5-triaryl- pyrazolines which contain sulphonamide group. The disadvantage of these compounds is generally that, although they show white shading effects on acrylonitrile polymers or copolymers and on synthetic polyamide, they have in part usually only a slight brightening effect on wool. Insofar as wool is brightened sufficiently, the brightening has an undesirable green effect, this particularly when the nitrogen atom of the sulphonamide group in the brightening agent is substituted from part of a basic nitrogen group.

The new compounds according to the invention form colourless to pale yellow coloured compounds which crystalise well and which can be easily isolated from the reaction mixture by the addition of water.

In the exhaustion processes at the temperatures given hereinbefore, or in padding processes, cotton and the like cellulose fibers, wool, silk and polyacrylonitrile fibers or fibers of copolymers of the latter are brightened from an aqueous acid bath which contains preferably from about 0.01 to 1% by weight of the optical brightener according to the invention, calculated on the substrate to be brightened depending on its nature.

When used in detergents, the amount of optical brightener according to the invention should range from about 0.01 to 0.5%, calculated on the total weight of the detergent composition. The new optical brighteners are used to advantage for the brightening of blended fabrics made from wool and polymeric or copolymeric acrylonitrile fibers, and also for the brightening of cellulose ester fibers. The optical brighteners according to the invention can also be readily used in the presence of agents which give off oxygen. The optical brighteners according to the invention can also be incorporated into masses for casting or spinning which serve for the production of synthetic articles such as foils, fibers, threads and such like. In the case of fibers made from polyacrylonitrile, especially when modified by acid groups and copolymerizates thereof, they can be added to the aqueous filament-forming precipitation or textile finishing baths. For instance, polyacrylonitrile fibers modified with itaconic acid can be brightened by adding to the conventional dimethyl formamide solution of the modified polymer prior to spinning, about 0.1% by weight, calculated on the total weight of the polymer, of a brightener according to the invention. In addition, the optical brighteners according to the invention can also be used in combination with detergents, especially in the brightening of cotton, wool, silk and synthetic polyamide fiber materials.

The 4 - substituted 1 - (pyrazolinylphenylsulphonyl)-piperazines of Formula I are produced by reaction of a sulphonic acid halide of Formula II

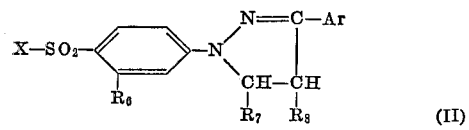

wherein

X represents halogen up to the atomic number 35, preferably chlorine, and

Ar, $R_6$, $R_7$, $R_8$ represent the radicals given in Formula I, with a piperazine derivative of Formula III

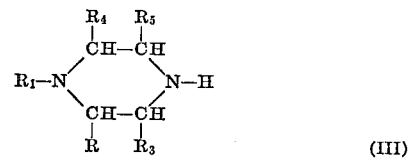

Wherein $R_1$, $R_2$, $R_3$, $R_4$ and $R_5$ have the meanings given in Formula I, The reaction preferably being performed in the presence of reaction accelerators.

Inorganic or organic bases such as alkali carbonates, alkali hydroxides, particularly however, tertiary nitrogen bases such as pyridine, triethylamine or triethylenediamine, can be used as agents to accelerate the reaction. The pyrazoline sulphonic acid halides required for this reaction are obtained by known processes, e.g. by reacting the corresponding sulphonic acid in an inert solvent with an inorganic acid halide such as thionyl chloride, the reaction optionally being performed in the presence of reaction accelerators such as dimethyl formamide, or however, they are obtained by reacting pyrazolines according to French Pat. No. 1,172,759, of Formula IV

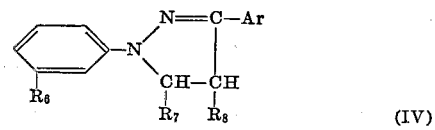

wherein Ar, $R_6$, $R_7$, $R_8$ have the meanings given in Formula I, with an excess of halogen sulphonic acid.

The reaction of the sulphonic acid halide of Formula II with a piperazine derivative of Formula III is preferably performed in an excess of tertiary nitrogen base such as pyridine, picolines, quinoline, quinuclidine, triethylamine, triethanolamine, dipropylamine, N-methyl pyrrolidine, N-methyl morpholine, N-methyl piperidine or triethylene diamine, and at a reaction temperature of between 40 and 120° C., preferably at 80–100° C.

The following non-limitative examples illustrate the invention further. Temperatures are given therein in degrees centigrade and all percentages are by weight.

EXAMPLE 1

(a) 142 g. of 1-(4'-chlorosulphonyl-phenyl)-3-(4"-chlorophenyl)-pyrazoline are stirred for 20 minutes at room temperature with 400 ml. of anhydrous pyridine. A solution of 64 g. of N-(3-hydroxyethyl)-piperazine in 100 ml. of anhydrous pyridine is stirred into this pale yellow suspension whereupon the temperature of the reaction mixture rises from 25° to 65°. A clear solution is formed within a short time, from which crystals soon begin to separate. After the mixture has been heated for another hour at 70–75°, 700 ml. of 80° hot water are added and the whole is then cooled to 10°. The pale yellow crystal slurry is filtered off under suction, washed with 500 ml. of water, well squeezed out and, finally, dried in vacuo at 70–80°. In this way, 166 g. of 1-[3-(p-chlorophenyl) - pyrazolin-(1)-yl-phenyl-(4')-sulphonyl]-4 - (3 - hydroxyethyl)-piperazine are obtained. The compound melts at 189–190° and has the formula

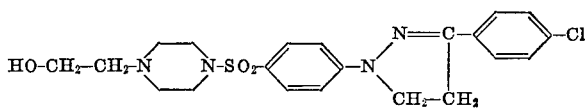

The new compound dissolves in ethylene glycol monomethyl ether with an intensively blue-violet fluorescence.

The product is used for the brightening of wool, synthetic polyamide, cellulose ester or polyacrylonitrile fibers.

The 1-(4'-chlorosulphonylphenyl)-3-(4"-chlorophenyl)-pyrazoline used in this example is obtained in the known way by reacting the sodium salt of 1-(4'-sulphophenyl)-3-(4" - chlorophenyl) - pyrazoline with thionyl chloride in chlorobenzene in the presence of catalytic amounts of dimethyl formamide.

(b) When replacing N-(β-hydroxyethyl)-piperazine in the above example by an equivalent amount of 1-(β-hydroxyethyl) - 3,5-dimethyl - piperazine, and otherwise repeating the above-given procedure, 1 - [3 - (p-chlorophenyl)-pyrazolin-(1)-yl-phenyl-(4')-sulfonyl] - 2,6-dimethyl-4-(β-hydroxyethyl)-piperazine is obtained in the form of pale yellow crystals. It is suitable for the optical brightening of wool and polyacrylic fibers.

EXAMPLE 2

17.8 g. of 1-(4'-chlorosulphonyl-phenyl)-3-(4"-chlorophenyl)-pyrazoline are stirred for 10 minutes at room temperature with 70 ml. of anhydrous pyridine. 12 g. of N-phenyl-piperazine are added to this pale yellow suspension whereupon the temperature of the reaction mixture rises to 67°. After heating for 5 minutes at 100°, the yellow-red reaction mixture is poured onto ice whereupon crystallisation begins. The crystals are filtered off under suction, washed with water, well squeezed out and dissolved and reprecipitated from dioxane. In this way, 17 g. of 1-[3-(p-chlorophenyl)-pyrazolin-(1)-yl-phenyl-(4')-sulphonyl]-4-phenyl-piperazine are obtained. The proudct melts at 211–212° and has the formula

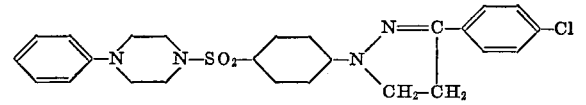

The new compound dissolves in ethylene glycol monomethyl ether with a very intensive blue-violet fluorescence. The product is used for the brightening of wool or polyacrylonitrile fibres.

EXAMPLE 3

17.8 g. of 1-(4'-chlorosulphonyl-phenyl)-3-(4"-chlorophenyl)-pyrazoline are stirred for 10 minutes at room temperature with 55 ml. of anhydrous pyridine. 12 g. of N-ethoxycarbonyl piperazine are added to this pale yellow suspension whereupon the temperature of the reaction mixture rises to 62°. The red solution is heated for 5 minutes at 100° and then stirred into ice. After some time, crystals are formed which are filtered off under suction. After recrystallisation from acetone, 14 g. of 1-[3-(p - chlorophenyl) - pyrazolin - (1) - yl-phenyl-(4')-sulphonyl]-4-carboethoxy-piperazine are obtained in this way. The compound melts at 176–178° and has the formula

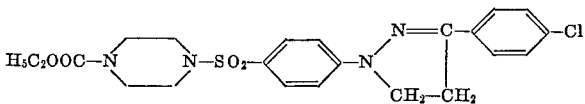

This new compound dissolves in ethylene glycol monomethyl ether with an intensive blue-violet fluorescence and it brightens wool and polyacrylonitrile fibres.

EXAMPLE 4

If the N-(3-hydroxyethyl)-piperazine used in Example 1 is replaced by N-methyl piperazine and the procedure in that example is followed, then 1-[3-(p-chlorophenyl)-pyrazolin - (1)-yl-phenyl-(4')-sulphonyl]-4-methyl-piperazine, M.P. 197–199°, of the formula

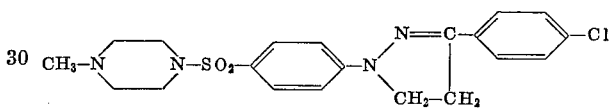

is obtained.

The new compound dissolves in ethylene glycol monomethyl ether with an intensive blue-violet fluorescence and it brightens polyacrylonitrile fibres and fabrics particularly brilliantly.

Other brighteners according to the invention having similar properties are obtained by replacing the pyrazoline starting material in the above example by an equivalent amount of one of the following chlorosulphonylphenyl-pyrazolines and reacting the latter with N-methyl piperazine following the above-given procedure:

(b)
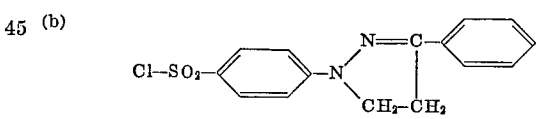

(c)
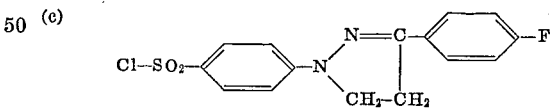

(d)
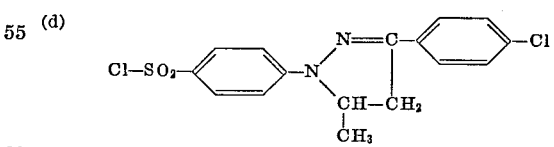

(e)
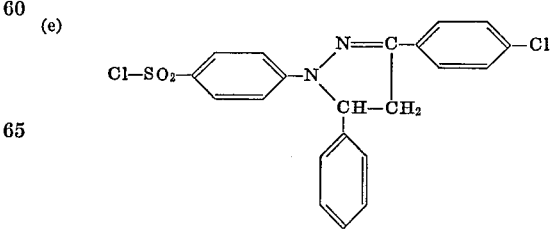

(f)
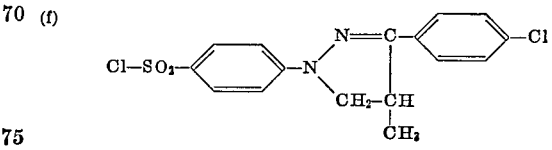

(g) 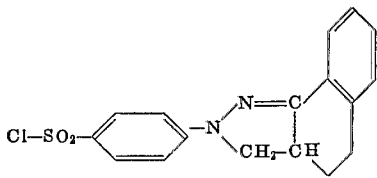

(h) 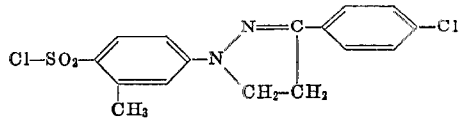

(i) 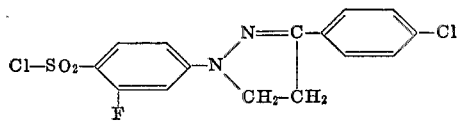

(j) 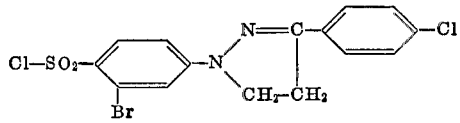

EXAMPLE 5

1 g. of 1-(3'-chloro-4'-chlorosulphonylphenyl)-3-(4''-chlorophenyl)-pyrazoline is stirred for 5 minutes at room temperature with 5 ml. of anhydrous pyridine. 1 g. of N-methyl piperazine is stirred into this pale yellow soluiton whereupon the temperature of the reaction mixture rises from 25° to 45°. A clear, red-yellow solution is formed within a short time. After the mixture has been heated for another 20 minutes at 60–70°, it is cooled and 20 ml. of water are added whereupon pale yellow crystals begin to separate out. The crystal slurry is filtered off under suction, washed with 50 ml. of water, well pressed out and recrystallised from acetone. In this way, after drying in vacuo at 70–80°, C. 8 g. of 1-[3-(p-chlorophenyl)pyrazolin-(1)-yl-3'-chlorophenyl-(4')-sulphonyl]-4-methyl-piperazine, M.P. 162–164°, of the formula

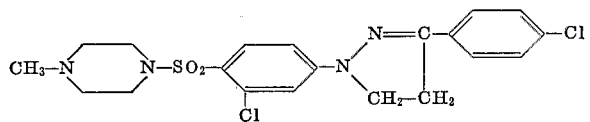

are obtained.

The new compound dissolves in ethylene glycol monomethyl ether with a very intensive blue-violet fluorescence. The product is used for the brightening of polyacrylonitrile fibres.

The 1 - (3' - chloro-4'-chlorosulphonylphenyl)-3-(4''-chlorophenyl)-pyrazoline used in this example is obtained in the known way by reacting the sodium salt of 1-(3'-chloro-4'-sulphonphenyl) - 3 - (4'' - chlorophenyl)-pyrazoline with thionyl chloride in chlorobenzene in the presence of catalyic amounts of dimethyl formamide.

EXAMPLES 6–11

If the N-phenyl piperazine mentioned in Example 2 is replaced by the equivalent amount of one of the N-substituted piperazines given in column 2 of the following table and the proecdure described in Example 2 is followed, then the corresponding 4-substituted 1-(pyrazolinylphenylsulphonyl)-piperazines are obtained which have the melting point given in column 3.

TABLE

| Example | N-substituted piperazine | M.P., degrees | Yield, percent [1] |
|---|---|---|---|
| 6 | CH₃–⟨⟩–N⌒N–H | 226 | 51 |
| 7 | ⟨⟩(CH₃,CH₃)–N⌒N–H | 227–229 | 70 |
| 8 | Cl–⟨⟩(CF₃)–N⌒N–H | 192–195 | 71 |
| 9 | Cl–⟨⟩–N⌒N–H | 235–236 | 68 |
| 10 | Cl–⟨⟩(Cl)–N⌒N–H | 235–236 | 64 |
| 11 | ⟨⟩–CH₂–N⌒N–H | 214–215 | 65 |

[1] Recrystallized from dioxane.

These 4-substituted 1-(pyrazolinylphenylsulphonyl)-piperazines too are valuable optical brighteners for polyacrylonitrile or wool.

EXAMPLE 12

0.9 ml. of a solution of 1 g. of the optical brightener of the formula

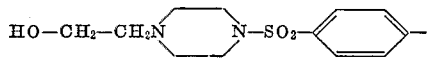
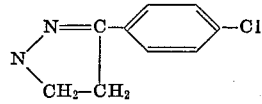

in 100 ml. of ethylene glycol monomethyl ether are added to a 40° warm bath consisting of 100 ml. of water, 0.1 g. of sodium acetate, 0.025 g. trisodium phosphate, 0.06 g. of octadecyl alcohol-pentadecyl glycol ether and 0.0125 g. of sodium bisulphite. A hank of polyacrylonitrile yarn ("Courtelle," Courtaulds, London, England) weighing 3 g. is introduced at 40° and the bath is heated to 95° within 10 to 15 minutes. The yarn is left for 30 minutes in the liquor circulating at 95° after which it is rinsed with cold water and dried.

Yarn so treated has a clearly more brilliantly white appearance than the untreated material.

EXAMPLE 13

0.9 ml. of a solution of 1 g. of the optical brightener of the formula

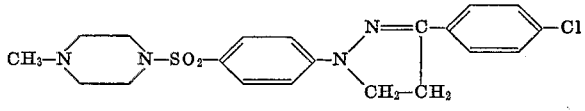

in 100 ml. of ethylene glycol monomethyl ether is added to a 40° warm bath consisting of 100 ml. of water, 0.06 g. of octadecyl alcohol pentadecyl glycol ether and 1.2 ml. of 8.5% formic acid. A polyacrylonitrile fabric ("Orlon," Du Pont, Wilmington, Del., USA) weighing 3 g. is introduced into the bath which is then heated to 98° within 15 minutes. The fabric is then left in the liquor circulating at 98° whereupon it is rinsed with cold water and dried. Compared with untreated material, the fabric so treated has a clearly brilliant more white appearance.

EXAMPLE 14

2.4 ml. of a solution of 1 g. of the optical brightener of the formula

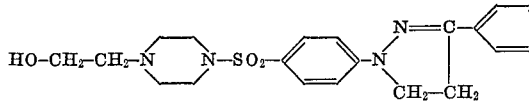

in 100 ml. of ethylene glycol monomethyl ether are added to a 40° warm bath consisting of 100 ml. of water 0.06 g. of octadecyl alcohol pentadecyl glycol ether and 6 ml. of hydrosulphite stabilised with sodium phosphate. Wool fabric weighing 3 g. is introduced and the bath is heated to 60° within 10 minutes. The fabric is left for 1 hour in the liquor circulating at 60° whereupon it is rinsed with cold water and dried. Compared with untreated material, the fabric so treated has a clearly brilliant, and more white appearance.

EXAMPLE 15

2.4 ml. of a solution of 1 g. of the optical brightener of the formula

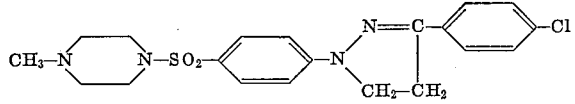

in 100 ml. of ethylene glycol monomethyl ether are added to a 40° warm bath consisting of 100 ml. of water, 0.06 g. of octadecyl alcohol pentadecyl glycol ether and 6 ml. of hydrosulphite stabilised with sodium phosphate. A wool fabric weighing 3 g. is introduced and the bath is located to 60° within 10 minutes. The fabric is left for 1 hour in the liquor circulating at 60° whereupon it is rinsed with cold water and dried. Compared with untreated material, the fabric so treated has a clear brilliant more white appearance.

EXAMPLE 16

30 g. of a pale yellowish fabric of nylon 66 staple fibers are immersed and moved for 30 minutes at 92° in 1000 ml. of an aqueous bath (liquor ratio 1:33), containing 0.03 g. of the brightener of the formula

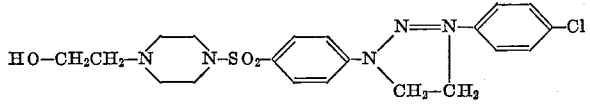

and 1.2 g. of concentrated formic acid (85%) and then rinsed and dried. The nylon fabric so treated appears considerably whiter in daylight than the untreated fabric.

EXAMPLE 17

Example 16 is repeated but in lieu of the optical brightener used therein, 30 mg. of the optical brightener produced by Example 4 (a) dissolved in 10 ml. of ethylene glycol monomethylether is added to the brightening bath. A well-brightened nylon fabric is obtained.

EXAMPLE 18

To produce a fine detergent.

20 g. of sodium dodecylbenzene sulfonate and
8 g. of sodium salt of lauryl alcohol sulfate are stirred with 80 g. of water and, at 60 to 70°, blended into a homogeneous mass with 0.7 g. of the brightener of the formula

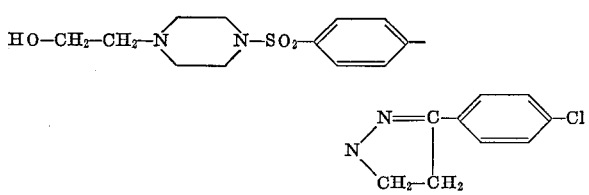

2 g. of lauric acid monoethanolamide,
8 g. of sodium tripolyphosphate,
1.5 g. of carboxymethyl cellulose and
60.5 g. of sodium sulphate are added to the mixture which is then dried and the particle size is reduced.

10 g. of white nylon 66 laundry are washed for 15 minutes at 55° in 330 ml. of an aqueous washing liquor containing 1.5 g. of the fine detergent described above, rinsed and dried. The washed goods have clearly a more white appearance than similar nylon washed in the same way with a fine detergent of analogous composition but not containing brightener.

White fabrics or articles made of cellulose acetate can be washed and simultaneously optically brightened in the same way.

EXAMPLE 19

(a) A solution of the optical brightener of the formula

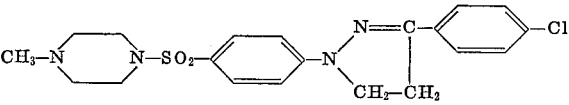

is produced by dissolving 1 g. in 100 ml. of ethylene glycol monoethyl ether. 0.6 ml. of this stock solution are added to an aqueous solution consisting of 100 ml. of water, 0.6 ml. of 4% acetic acid and 0.06 g. of octadecyl alcohol-pentadecaglycol ether. This preparation is heated to 40° and then 3 g. of cellulose acetate satin fabric are introduced. The temperature is raised to 75° within 10 to 15 minutes and kept there for 1 hour. The fabric is then rinsed and dried. Compared with untreated starting material, the fabric so treated has clearly a more white, brilliant appearance.

(b) Similar brightening effects are obtained on cellulose triacetate twill fabric when 3 g. of the latter are treated by the same procedure and with the same brightening liquor as used in the above example.

EXAMPLE 20

0.4 g. of the brightener of the formula

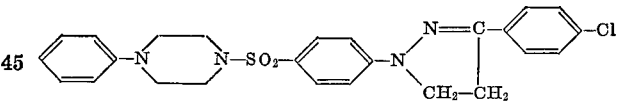

5 g. of titanium dioxide (Anatas), 75 g. of cellulose acetate and 25 g. of diethyl phthalate in 900 g. of acetone are homogenised into an opaque solution and cast onto glass plates. After evaporation of the acetone, a removable opaque film is obtained which is much more brilliant white than a comparative sample produced without brightener.

EXAMPLE 21

0.008 g. of the optical brightener produced as described in Example 1(a) and dissolved in 1 ml. of ethylene glycol monomethyl ether is added to a bath prepared from 300 ml. of water, 0.08 g. of the condensation product of octadecanol and ethylene oxide (molar ratio of 1:15) and 0.16 ml. of 85%-formic acid and the bath is heated to 70°. 7.0 g. of a blended fabric, consisting of polyacrylonitrile fibers (of filaments produced from the spinnable solution described in Example 1 of British Pat. No. 830,830, or of Acrilan 16, Orlon 42 or Dralon) and of wool in a weight ratio of about 1:1, are introduced into the bath which is then heated up to 95° for 15 minutes, kept at that temperature for another 30 minutes and then permitted to cool to 55°.

Sufficient aqueous ammonia solution is then added to adjust the pH of the bath to 7, whereupon first 0.3 g. of stabilized sodium dithionate, and thereafter a solution of 0.006 g. of the aforesaid optical brightener dissolved in 0.75 ml. of ethylene glycol monomethyl ether are added to the bath and the same is heated 55° to 60° for 60 minutes. The fabric is then rinsed with cold water and dried. All fibers of the fabric are brightened evenly in a pure, neutral white shade.

EXAMPLE 22

An aqueous bath is prepared from 300 ml. of water, 1.5 g. of sodium dithionite containing about 20% of tetrasodium pyrophosphate as stabilizer, 0.3 g. of the condensation product of cetyl alcohol and ethylene oxide in a molar ratio of about 1:18, and 0.15 g. of a mixture of ethylene-diamine-tetraacetic acid and sodium carbonate in a weight ratio of 3:2 in an autoclave. In a first run 0.75 ml., and in a second run 2.25 ml. of a solution of the optical brightener of Formula VI dissolved in Cellosolve in a concentration of 1 g. in 100 ml., are added to the bath. 15 g. of nylon 66 staple fiber is then added to the bath in each run, the autoclave is closed, its contents heated up to 110° during about 20 to 25 minutes and held at that temperature for 30 minutes, whereupon the autoclave is left to cool to 80° and then opened and the fabric removed, rinsed in cold water and dried.

The same runs repeated with the above-mentioned two concentrations of the known optical brightener of Formula V and with the optical brightener of the formula

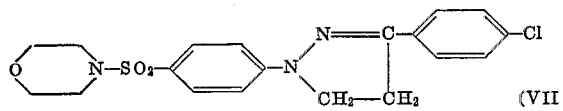

(VII)

While nylon fabrics brightened with compounds of Formulas V and VI show very satisfactory brilliant white shades, the fabric treated with the compound of Formula VII is clearly unsatisfactory.

EXAMPLE 23

An aqueous bath is prepared from 100 ml. of water, to which 0.5 of sodium-dithionite containing about 20% of tetra sodium pyrophosphate as stabilizer, and 0.1 g. of sodium hydroxide aqueous solution of 36° Bé are added in an open vessel. 3 g. of cotton fabric (prebleached Cretonne) are introduced into the bath to which the optical brightener of Formula VI has been added in amounts of 2 mg. in a first run, 4 mg. in a second run and 8 mg. in a third run. The bath of each run is then heated up during about 20 minutes to 98° C. and held at that temperature for about 30 minutes, whereupon the fabrics are removed, rinsed in cold water and dried.

In a similar manner, three separate runs are made with the optical brighteners of Formulas V and VII respectively.

While the fabrics treated with the brightener of Formula V are quite well brightened, the fabrics treated with the compound of Formula VI are of superior more brilliant whiteness, while the fabrics treated with the compound of Formula VII are clearly unsatisfactory. This is confirmed by the following table showing the fluorescence values obtaining with the three compounds in each of the three above-mentioned runs:

| Compound of formula: | First run, 20 mg./liter | Second run, 40 mg./liter | Third run, 80 mg./liter |
| --- | --- | --- | --- |
| V | 64 | 67 | 70 |
| VI | 76 | 86 | 83 |
| VII | 16 | 16 | 20 |

EXAMPLE 24

An aqueous bath is prepared from 300 ml. of water, and 1.2 g. of a detergent composition consisting of 14 parts of sodium lauryl-sulfate,
6 parts of sodium nonylbenzenesulfonate,
4 parts of coconut acid ethanol-amide,
45 parts of sodium tripolyphosphate,
12.5 parts of sodium metasilicate,
1 part of carboxymethylcellulose,
10 parts of sodium sulfate, and
7.5 parts of water (moisture).

Optical brightener of Formula VI is added to three different runs in concentrations of 20 mg., 40 mg. and 80 mg. per liter, respectively. While in the preceding example, the brightener was added to the bath in the form of a solution in Cellosolve of a 1 g. in 100 ml. concentration, it is added in the instant example in a solution of 1 g. of brightener per 1000 ml. of Cellosolve.

9 g. of a mixed load consisting of 3 g. of cotton cretonne fabric, prebleached, 3 g. of nylon 66 staple fiber fabric and 3 g. of Dacron staple fiber fabric, are then introduced into the bath, the latter is heated during about 20 minutes to a temperature of 55° and held for 30 minutes at that temperature, the fabrics are then removed, rinsed in cold water and dried.

The cotton and nylon fabrics show an excellent white shade, while the Dacron fabric is unbrightened, but also free from any yellowish discoloration.

When repeating the above runs with the optical brightener of Formula VII, no satisfactory brightening of the cotton and nylon fabrics is obtained.

We claim:

1. A compound of the formula

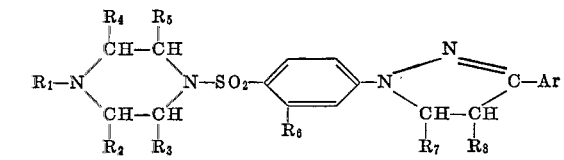

wherein

Ar represents a phenyl radical any substituent of which is selected from fluorine, chlorine or bromine, $R_1$ represents lower alkyl, hydroxy-alkyl of 1 to 3 carbon atoms, lower alkoxy-carbonyl, benzyl or a phenyl radical any substituent of which is selected from chlorine, bromine, lower alkyl and trifluoromethyl, each of $R_2$, $R_3$, $R_4$ and $R_5$ represents hydrogen or alkyl of at most 4 carbon atoms, $R_6$ represents hydrogen, lower alkyl, fluorine, chlorine or bromine, $R_7$ represents hydrogen, lower alkyl or phenyl, and $R_8$ represents hydrogen, lower alkyl or an alkylene bridge to a ring carbon atoms of Ar in o- position to that linked to the pyrazoline ring, which bridge has from 2 to 4 carbon atoms.

2. A compound as defined in claim 1 wherein Ar represents the p-chlorophenyl radical, $R_1$ represents a hydroxy-lower alkyl group and $R_2$, $R_3$, $R_4$, $R_5$, $R_7$ and $R_8$ represent hydrogen.

3. A compound as defined in claim 1, which is 1-[3-(p-chlorophenyl) - pyrazolin-(1)-yl-phenyl-(4')-sulfonyl]-4-(β-hydroxyethyl)-piperazine.

4. A compound as degned in claim 1, which is 1-[3-(p-chlorophenyl) - pyrazolin-(1)-yl-phenyl-(4')-sulfonyl]-4-methyl-piperazine.

References Cited

UNITED STATES PATENTS 2,507,408   5/1950   Jacob _____ 260—268

HENRY R. JILES, Primary Examiner

C. M. SHURKO, Assistant Examiner

U.S. Cl. X.R.

117—33.5; 252—161; 301.3